United States Patent
George et al.

(10) Patent No.: US 8,595,197 B2
(45) Date of Patent: Nov. 26, 2013

(54) MESSAGE VALIDATION IN A SERVICE-ORIENTED ARCHITECTURE

(75) Inventors: David P. George, Eastleigh (GB); Carlo Marcoli, Woking (GB)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/150,833

(22) Filed: Jun. 1, 2011

(65) Prior Publication Data
US 2011/0320503 A1 Dec. 29, 2011

(30) Foreign Application Priority Data

Jun. 29, 2010 (EP) .................................... 10167743

(51) Int. Cl.
*G06F 17/00* (2006.01)
(52) U.S. Cl.
USPC .......................................... 707/693; 707/713
(58) Field of Classification Search
USPC ................. 707/687–697, 759–766, 705–719, 707/802–805
See application file for complete search history.

(56) References Cited

U.S. PATENT DOCUMENTS

| | | | |
|---|---|---|---|
| 2002/0184401 A1 | 12/2002 | Kadel, Jr. et al. | |
| 2003/0204756 A1* | 10/2003 | Ransom et al. | 713/300 |
| 2005/0027871 A1* | 2/2005 | Bradley et al. | 709/227 |
| 2007/0283423 A1* | 12/2007 | Bradley et al. | 726/4 |
| 2008/0056500 A1* | 3/2008 | Bradley et al. | 380/279 |
| 2008/0162529 A1 | 7/2008 | Stuhec | |
| 2009/0094453 A1* | 4/2009 | Bradley et al. | 713/153 |
| 2010/0313038 A1* | 12/2010 | Bradley et al. | 713/189 |
| 2011/0138266 A1* | 6/2011 | Hiyama et al. | 715/234 |
| 2011/0179089 A1* | 7/2011 | Idicula et al. | 707/803 |
| 2011/0244919 A1* | 10/2011 | Aller et al. | 455/556.1 |
| 2011/0302239 A1* | 12/2011 | Grateau et al. | 709/203 |
| 2012/0124017 A1* | 5/2012 | Heuer et al. | 707/693 |

* cited by examiner

*Primary Examiner* — Wilson Lee
(74) *Attorney, Agent, or Firm* — A. Bruce Clay (57) ABSTRACT

Message validation in a service-oriented architecture defines a message structure using XML data types. Context-independent validity constraints are specified using an XML schema. Context-specific validity constrains are specified in an intermediary data structure for a specific service operation. A service interface including the XML schema and the intermediary data structure is published.

20 Claims, 6 Drawing Sheets

MESSAGE VALIDATION IN A SERVICE-ORIENTED ARCHITECTURE

BACKGROUND

This invention relates, in general, to the field of message validation in a service-oriented architecture (SOA), and, in particular, the invention relates to enabling context specific validation.

State of the art service interfaces are defined with the Web Service Definition Language (WSDL) that uses Extensible Markup Language (XML) schemas, for example, the XML Schema published as a World Wide Web Consortium (W3C) referred to as XML Schema Definition (XSD), to specify input and output messages. Heterogeneous parties can work together in an SOA ecosystem only if they share a common vocabulary, hence, the wide adoption of standard object models.

Standard data structures, reused in multiple contexts, must contain a generic superset of the data required by each individual service. As a result, service interfaces based on these generic objects are not well specified, particularly from the point of view of message validation. Consider the case of two service interfaces defined using the same "Customer" type. One service interface requires the "DateOfBirth" field of "Customer," the other does not. It is then unclear whether or not "DateOfBirth" should be a mandatory attribute of "Customer." If it is not a mandatory field, the first interface is not well specified. If it is a mandatory field, the second interface will contain unnecessary constraints.

The opposite design approach uses messages decoupled from object models. Messages become containers of a flat list of attributes; lists that include only the data required by the service. The interface is strictly specified, but it has little semantic value because it is not expressed in terms of the reference object model. Moreover, when a composite service is built by aggregating multiple atomic services, a set of data transformations is required to create different data types for different services. This has a significant impact on development costs and runtime performance.

BRIEF SUMMARY

According to one embodiment of the present invention a method validates messages in a service-oriented architecture. A message structure is defined using XML data types. Context-independent validity constraints are specified using an XML schema. Context-specific validity constraints are specified for a specific service operation in an intermediary data structure. A service interface, including the XML schema and the intermediary data structure, is published.

According to one embodiment of the present invention a method validates messages in a service-oriented architecture. A message is received according to an XML data type. The message is validated, using a processor, according to context-independent validity constraints of an XML schema with reference to XML schema definitions. The message is validated, using the processor, according to context-specific validity constraints of an intermediary data structure for a specific service operation with reference to intermediary data structure definitions.

According to one embodiment of the present invention a computer program product validates messages in a service-oriented architecture. The computer program product comprises a computer-readable storage medium having computer readable program code embodied therewith. The computer readable program code is configured to define a message structure using XML data types, to specify context-independent validity constraints using an XML schema, to specify context-specific validity constraints for a specific service operation in an intermediary data structure, and to publish a service interface including the XML schema and the intermediary data structure.

According to one embodiment of the present invention a system validates messages in a service-oriented architecture. The system comprises a processor and memory connected to the processor, wherein the memory is encoded with instructions. The instructions when executed comprise instructions for receiving a message for a service implementation, instructions for validating with a first validator according to context-independent validity constraints of an XML schema with reference to XML schema definitions in a file system, and instructions for validating the message with a second validator according to context-specific validity constraints of an intermediary data structure for a specific service operation with reference to intermediary data structure definitions in a file system.

DETAILED DESCRIPTION

For simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A method and system are described for specifying and enforcing message validation in a service-oriented architecture (SOA). The described method and system enable context specific validation of generic (context-independent) objects.

An intermediary data structure, referred to as a "view," is used between service interfaces and data types. Service interfaces are defined in terms of standard data types while context-specific constraints are captured by views. A view is an intermediate data structure that defines the elements of a data type that are mandatory in the context of a service. In one embodiment, the intermediate data structure is defined using a query language, although other computer languages may be used. Defining the data structure using a query language enables efficient navigation of the data structure.

A service runtime environment validates service requests and service responses according to the constraints defined by the data types and views. The described system enables the definition of strict, context-specific, validation rules for standard, generic object models. Calls to multiple service interfaces defined according to the described system can be orchestrated without the need of multiple data transformations, this reduces development cost and improves runtime performance.

Figure 1:
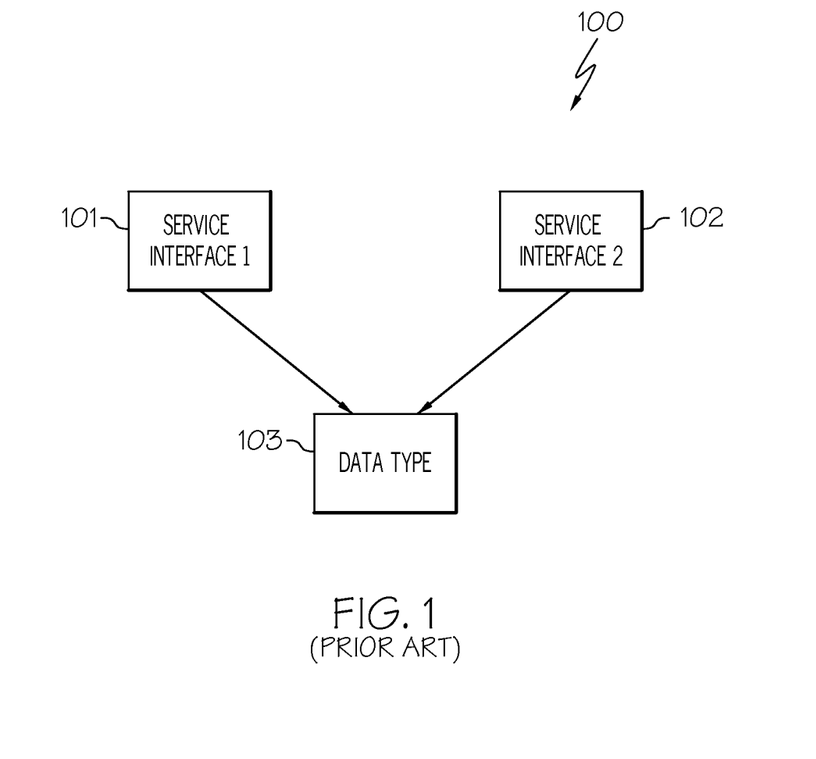
FIG. 1 is a schematic diagram of service interfaces and data types, as known in the prior art.

Referring to FIG. 1, a schematic diagram shows a representation 100 of a first service interface 101 and a second service interface 102 which are defined using a common data type 103.

Figure 2:
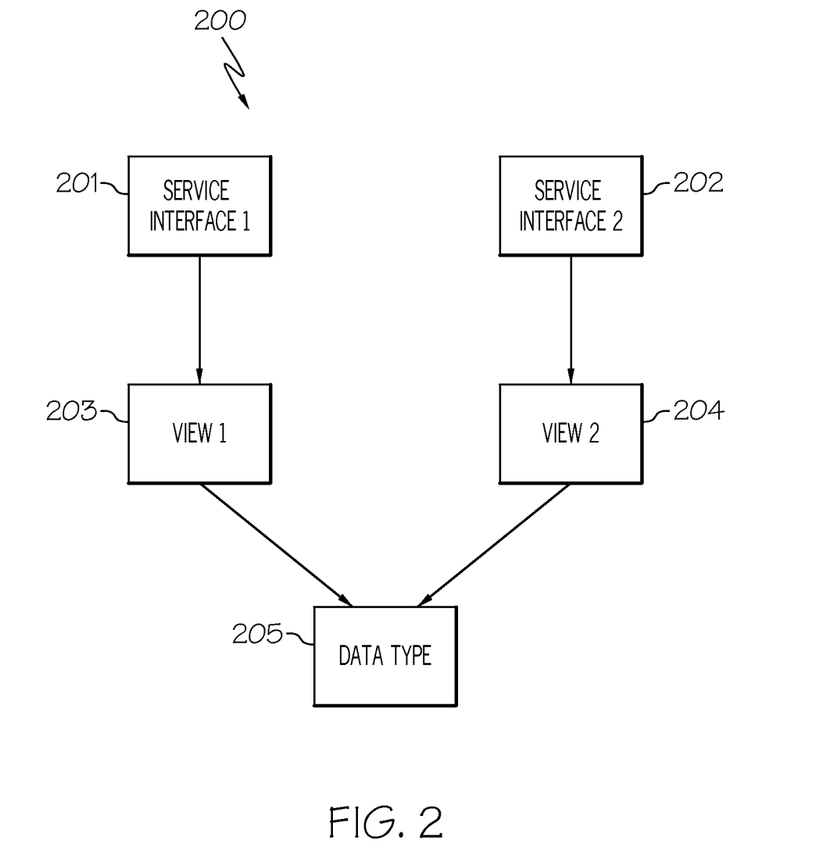
FIG. 2 is a schematic diagram of service interfaces and data types in accordance with an embodiment of the present invention.

Referring to FIG. 2, a schematic diagram shows a representation 200 of a first service interface 201 and a second service interface 202, each of which are defined using a common data type 205. In accordance with the described method and system, intermediary data structures 203, 204 are defined between the service interfaces 201, 202 and the common data type 205.

A first intermediary data structure 203 referred to as "View 1" is provided with context-specific constraints between the first service interface 201 and the context-independent common data type 205. A second intermediary data structure 204 referred to as "View 2" is provided with context-specific constraints between the second service interface 202 and the context-independent common data type 205. The described method and system can be applied to any interface exchanging XML.

In one embodiment, a service-oriented architecture (SOA) is implemented by service providers and service consumers which define and use services. WSDL is used in conjunction with Simple Object Access Protocol (SOAP) and an XML schema to provide web services over the Internet. A client program connecting to a web service can read the WSDL to determine what operations are available on the server. The client can then use SOAP to actually call one of the operations listed in the WSDL.

A service in WSDL is a set of system functions that have been exposed to web based protocols. An interface defines a web service, the operations that can be performed, and the messages that are used to perform the operation. Types are provided in WSDL to describe the data. XML schema is used (inline or referenced) for this purpose.

In another embodiment, a Representational State Transfer (REST) architecture for distributed hypermedia systems may be used to define a SOA. A RESTful web service (also called a RESTful web application programming interface (API)) is a simple web service implemented using Hypertext Transfer Protocol (HTTP) and the principles of REST.

In both cases, an XML schema is used as a description of a type of XML document, typically expressed in terms of constraints on the structure and content of documents of that type, above and beyond the basic syntactical constraints imposed by XML itself. These constraints include data types that govern the content of elements and attributes.

There are languages developed specifically to express XML schemas. The Document Type Definition (DTD) language, which is native to the XML specification, is a schema language with relatively limited capability, but that also has other uses in XML, aside from the expression of schemas. Two more expressive XML schema languages in widespread use are XSD and RELAX NG (REgular LAnguage for XML Next Generation).

The process of checking to see if an XML document conforms to a schema is called validation, which is separate from XML's core concept of syntactic well-formedness. All XML documents must be well-formed, but it is not required that a document be valid unless the XML parser is "validating," in which case the document is also checked for conformance with its associated schema. DTD-validating parsers, XML Schema (W3C) (XSD) parsers, and RELAX NG parsers are known.

Documents are only considered valid if they satisfy the requirements of the schema with which they have been associated. These requirements typically include such constraints as:

Elements and attributes that must/may be included, and their permitted structure;

The structure as specified by a regular expression syntax; and

How character data is to be interpreted, e.g. as a number, a date, a URL, a Boolean, etc.

Validation of an instance document against a schema can be regarded as a conceptually separate operation from XML parsing. In practice, however, many schema validators are integrated within an XML parser.

An XML schema language, (for example, XSD or DTD) can be used to express a set of rules to which an XML document must conform in order to be considered 'valid' according to that schema. An XML schema allows the content of an element or attribute to be validated against a data type.

An example embodiment is described with reference to FIG. 2. The service interfaces 201, 202 are defined with Web Service Definition Language (WSDL) that uses XML schemas (XSD) to specify input and output messages. The XML schemas specify data types 205 (XSD types).

The intermediary data structures 203, 204 use a query language (for example, an XML query language such as XML Path Language (XPath)) to define elements of the common data type 205 that are mandatory in the context of a service.

Figure 3:
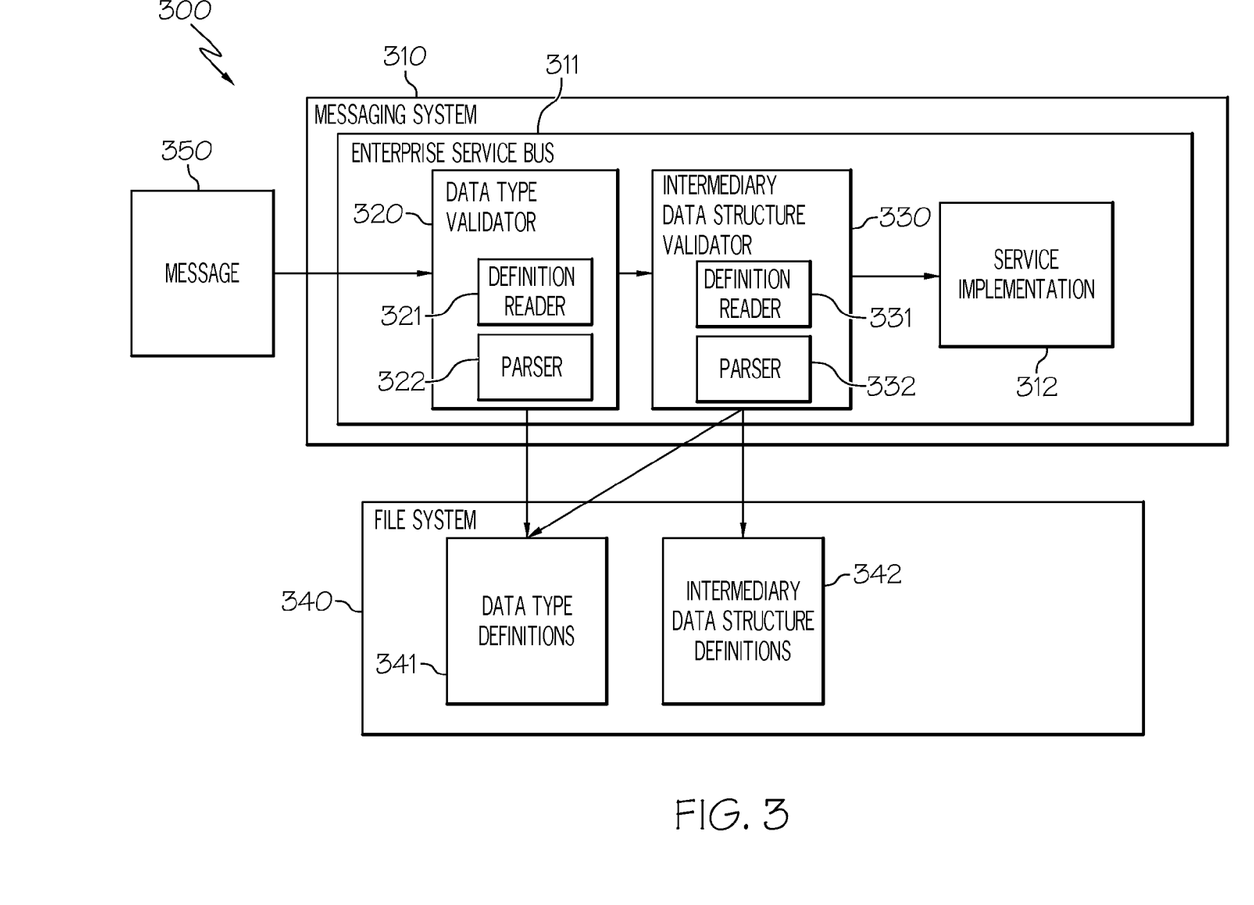
FIG. 3 is a block diagram of an embodiment of a system in accordance with the present invention.

Referring to FIG. 3, a block diagram shows an embodiment of the described system 300 for message validation in a service runtime environment. A messaging system 310 (for example, an enterprise messaging system) has an abstraction layer providing a platform 311 implementing a service (for example, an enterprise service bus). The platform 311 provides a service implementation 312. The service implementation 312 is modified to support the described intermediary data structure validation.

The platform 311 includes a data type validator 320 and an intermediary data structure validator 330. The data type validator 320 includes a definition reader 321 and a parser 322. The data type validator 320 uses its definition reader 321 to reference a file system 340 including context-independent data type definitions 341. The parser 322 of the data type validator 320 parses a message 350 using a mapping framework.

The intermediary data structure validator 330 includes a definition reader 331 and a parser 332. The intermediary data structure validator 330 uses its definition reader 331 to reference a file system 340 including context-specific intermediary definitions 342. The definition reader 331 of the intermediary data structure validator 330 also references the context-independent data type definitions 341 in the file system 340. The parser 332 of the intermediary data structure validator 330 parses a message 350 using a mapping framework.

A message 350 in the form of a service request or a service response, according to a data type, is received at the platform 311 and validated by the data type validator 320 which uses the context-independent data type definitions 341 and by the intermediary validator 330 which uses the context-specific intermediary definitions 342 and the context-independent data type definitions 341.

The validators 320, 330 can be implemented by a Java (Java is a registered trademark of Oracle and/or its affiliates) class reading the definitions 341, 342 from the file system 340 and parsing the request message using a common XML to Java mapping framework (for example, Service Data Objects (SDO)).

In one embodiment, the data type validator 320 is an XML schema validator and the intermediary data structures validator 330 is an XML view validator. The definitions 341, 342 are corresponding XML schema definitions and XML view definitions. A message 350 is a data type in the form of an XML schema (XSD) type.

Figure 4:
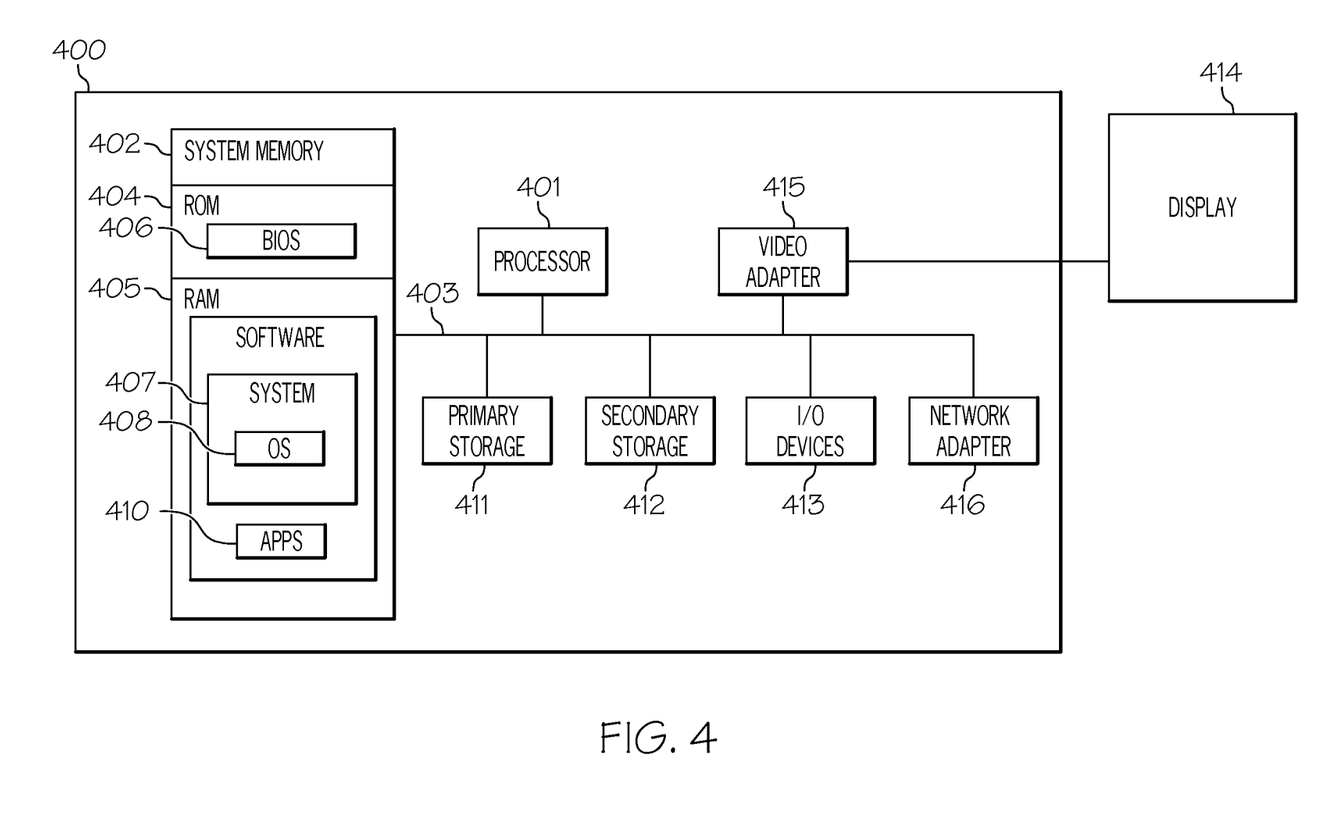
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402. The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
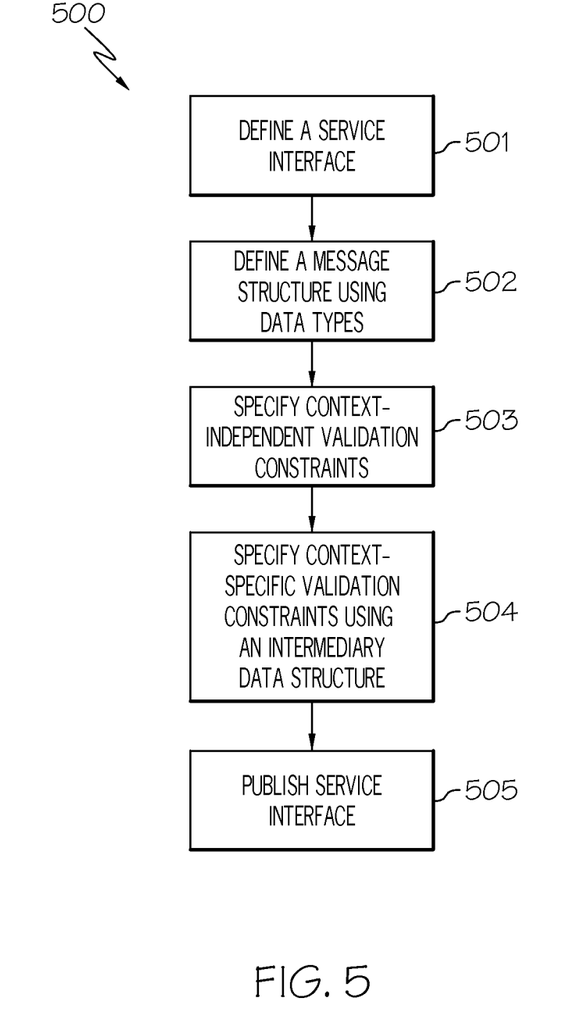
FIG. 5 is a flow diagram in accordance with an embodiment of the present invention.

Referring to FIG. 5, a flow diagram 500 shows one embodiment of the described system as carried out at a service provider. A service provider defines a service interface at block 501. The service provider defines message structures using data types of an XML schema at block 502. The service provider specifies context-independent validation constraints in the XML schema at block 503. The service provider specifies context-specific validation constraints using an intermediary data structure (for example, using an XML query language) at block 504. The service provider publishes the service interface at block 505.

In one embodiment, the service provider defines a service interface using WSDL and the message structures using XSD types of an XML schema. The service provider specifies context-independent validation constraints in the XML schema. The service provider specifies context-specific validation constraints using an XML query language to provide an intermediary data structure in the form of an XML view. The service provider publishes the service interface in the form of WSDL, XSD and XML Views. In one embodiment, the message structures may be defined using DTD types.

Figure 6:
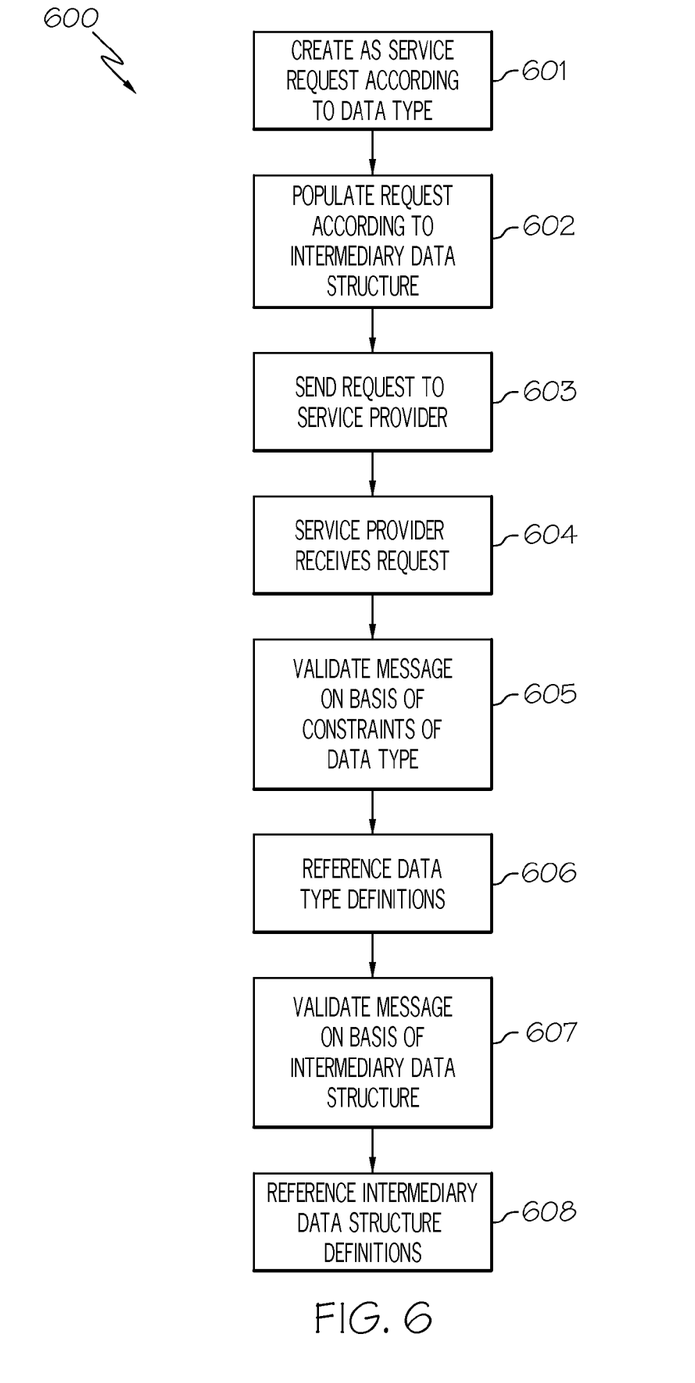
FIG. 6 is a flow diagram of a method in accordance with an embodiment of the present invention.

Referring to FIG. 6, a flow diagram 600 shows a further aspect of the described system. A service consumer creates a service request message according to a data type at block 601. The consumer populates the request according to the constraints of an intermediary data structure (for example, as an XML query language data structure) at block 602. The consumer sends the request to the service provider at block 603.

The service provider receives the request at block 604. The service provider validates the message on the basis of the constraints expressed by the XML schema including referencing context-independent data type definitions at blocks 605 and 606. The service provider validates the message on the basis of the constraints expressed by the intermediary data structure including referencing the context-specific intermediary data structure definitions at blocks 607 and 608.

In one embodiment, the service consumer creates a service request message according to an XSD type in accordance with an XML view provided by an XML query language. The service provider validates the message on the basis of the XSD type including referencing XML schema definitions. The service provider also validates the message on the basis of the XML view referencing the XML view definitions.

An example of a context-independent customer data structure defined by the following XML schema, follows:

```
<xsd:complexType name="Customer">
    <xsd:sequence>
        <xsd:element name="name"
type="xsd:string"></xsd:element>
        <xsd:element name="surname"
        type="xsd:string"></xsd:element>
        <xsd:element name="dateOfBirth"
        type="xsd:date"></xsd:element>
        <xsd:element name="contactDetails"
        type="bons0:ContactDetails"> </xsd:element>
    </xsd:sequence>
</xsd:complexType>
<xsd:complexType name="ContactDetails">
    <xsd:sequence>
        <xsd:element minOccurs="0"
        name="address" type="xsd:string"></xsd:element>
        <xsd:element minOccurs="0"
        name="phoneNumber" type="xsd:string"></xsd:element>
    </xsd:sequence>
</xsd:complexType>
```

In the above schema, the context-independent customer data structure requires: name, surname, date of birth, and contact details. The contact details include address and phone number. As both the address and phone number are defined as a minimum of 0 occurrences, these are not mandatory.

The following XML View can be used to specify that "customer name" and "customer address" are mandatory in the context of a specific service interaction:

```
<view name="updateCustomerAddressView" type="Customer">
    <queries language = "XPath">
    <query >Customer/name</query>
    <query>Customer/contactDetails/address</query>
    </queries>
</view>
```

An XML View can be associated to a service operation by extending the WSDL syntax as follows:

```
<wsdl:message name="updateCustomerAddressRequestMsg">
    <wsdl:part element="ZZZ" view="updateCustomerAddressView"
name="updateCustomerAddressParameters"/>
</wsdl:message>
<wsdl:portType name="CustomerManagementService">
<wsdl:operation name="updateCustomerAddress"
```

-continued

```
<wsdl:input message="tns:updateCustomerAddressRequestMsg"
name="updateCustomerAddressRequest"/>
<wsdl:output message="tns:updateCustomerAddressResponseMsg"
name="updateCustomerAddressResponse"/>
    </wsdl:operation>
</wsdl:portType>
```

In the above, the element attribute of the WSDL syntax is maintained and the new "view" attribute is added to the message part.

The following XML snippet is an example of a message instance defined using the above specification:

```
<updateCustomerAddressRequestMsg>
<Customer>
    <name>John</name>
    <contactDetails>
        <address>Blue Street</address>
    </contactDetails>
<Customer>
</updateCustomerAddressRequestMsg>
```

The message instance includes the attributes of "customer name" and "customer address" and therefore can be validated in the specific context of the service operation. A message instance only including the attributes of "customer name" and "customer phone number" would not be validated in the specific context of the service operation.

In this way, the XML schema defines a set of elements or attributes, not all of which may be required. The XML View specifies the elements or attributes of the schema which are required in the specific context.

An embodiment of the present invention removes the hard link between validation constraints and data types. As a result, the validation constraints associated to one service operation can be modified without impacting all the other services using the same type, thus, bringing a tighter declaration of the parameters and constraints which apply to individual calls, decoupled from the data types behind them, to the web service infrastructure.

The described method and system forms declarative specifications of multiple contexts containing different sets of constraints which apply in each context. The declarations are incorporated as part of the published specification of the service, referred to by interface call definitions as appropriate.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of removing a hard link between validation constraints and data types in a service-oriented architecture, comprising:
    defining, with a processor, a message structure using XML data types;
    specifying, with said processor, context-independent validity constraints using an XML schema;
    specifying, with said processor, context-specific validity constraints for a specific service operation in an intermediary data structure, wherein all of said context-specific validity constraints are required for said specific service operation;
    publishing a service interface including the XML schema and the intermediary data structure, said intermediary data structure including said context-specific validity constraints; and
    decoupling specific validity constraints from the data types by maintaining generality with said context-independent validity constraints using an XML schema that apply to service operations in the service-oriented architecture and adding validation specificity with said intermediary data structure including said context-specific validity constraints for use with said specific service operation added to the service-oriented architecture, wherein the general reusability of the context-independent validity constraints using an XML schema is maintained.

2. The method of claim 1, wherein the intermediary data structure defines elements or attributes of a mandatory data type in the context of a specific service operation.

3. The method of claim 2, wherein the intermediary data structure uses an XML query language for constraints and enforces context specific constraints on data types in the XML schema.

4. The method of claim 3, wherein a service interface is defined with Web Service Definition Language (WSDL) and the intermediary data structure associated with a service operation extends the WSDL syntax.

5. The method of claim 3, wherein the service interface comprises a Representational State Transfer (REST) web service.

6. The method of claim 3, wherein the XML schema comprises XSD and the XML data types comprise XSD types.

7. The method of claim 6, wherein the XML schema comprises Document Type Definition (DTD) and the XML data types comprise DTD types.

8. A computer program product for removing a hard link between validation constraints and data types in a service-oriented architecture, the computer program product comprising a computer-readable storage device having computer readable program code embodied therewith, the computer readable program code comprising:
    computer readable program code configured to define a message structure using XML data types;
    computer readable program code configured to specify context-independent validity constraints using an XML schema;
    computer readable program code configured to specify context-specific validity constraints for a specific service operation in an intermediary data structure, wherein all of said context-specific validity constraints are required for said specific service operation;

computer readable program code configured to publish a service interface including the XML schema and the intermediary data structure, said intermediary data structure including said context-specific validity constraints; and computer readable program code configured to decouple specific validity constraints from the data types by maintaining generality with said context-independent validity constraints using an XML schema that apply to service operations in the service-oriented architecture and adding validation specificity with said intermediary data structure including said context-specific validity constraints for use with said specific service operation added to the service-oriented architecture, wherein the general reusability of the context-independent validity constraints using an XML schema is maintained.

9. The computer program product of claim 8, wherein the intermediary data structure defines elements or attributes of a mandatory data type in the context of a specific service operation.

10. The computer program product of claim 9, wherein the intermediary data structure uses an XML query language for constraints and enforces context specific constraints on data types in the XML schema.

11. The computer program product of claim 10, wherein a service interface is defined with Web Service Definition Language (WSDL) and the intermediary data structure associated with a service operation extends the WSDL syntax.

12. The computer program product of claim 10, wherein the service interface comprises a Representational State Transfer (REST) web service.

13. The computer program product of claim 10, wherein the XML schema comprises XSD and the XML data types comprise XSD types.

14. The computer program product of claim 13, wherein the XML schema comprises Document Type Definition (DTD) and the XML data types comprise DTD types.

15. A system for removing a hard link between validation constraints and data types in a service-oriented architecture, comprising:

a processor; and memory connected to the processor, wherein the memory is encoded with instructions and wherein the instructions when executed comprise:

instructions for defining a message structure using XML data types;

instructions for specifying context-independent validity constraints using an XML schema;

instructions for specifying context-specific validity constraints for a specific service operation in an intermediary data structure, wherein all of said context-specific validity constraints are required for said specific service operation;

instructions for publishing service interface including the XML schema and the intermediary data structure, said intermediary data structure including said context-specific validity constraints; and instructions for decoupling specific validity constraints from the data types by maintaining generality with said context-independent validity constraints using an XML schema that apply to service operations in the service-oriented architecture and adding validation specificity with said intermediary data structure including said context-specific validity constraints for use with said specific service operation added to the service-oriented architecture, wherein the general reusability of the context-independent validity constraints using an XML schema is maintained.

16. The system of claim 15, wherein the intermediary data structure defines elements or attributes of a mandatory data type in the context of a specific service operation.

17. The system of claim 16, wherein the intermediary data structure uses an XML query language for constraints and enforces context specific constraints on data types in the XML schema.

18. The system of claim 17, wherein a service interface is defined with Web Service Definition Language (WSDL) and the intermediary data structure associated with a service operation extends the WSDL syntax.

19. The system of claim 17, wherein the service interface comprises a Representational State Transfer (REST) web service.

20. The system of claim 17, wherein the XML schema comprises XSD and the XML data types comprise XSD types.

* * * * *